an image is partitioned into a plurality of image blocks, the
image having A×B pixels, each of the image blocks having
N×M pixels, wherein N is less than A and M is less than B.
Next, a selected image block is outputted by selecting one of
the image blocks as the selected image block. After that, a
compressed image block is produced by storing the selected
image block and compressing the selected image block. The
step of outputting the selected image block and the step of
producing the compressed image block are repeated until the
image blocks are compressed into a plurality of compressed
image blocks. Finally, a compressed image file is produced
according to the compressed image blocks.

(12) United States Patent
Chiang et al.

(10) Patent No.: US 7,602,975 B2
(45) Date of Patent: Oct. 13, 2009

(54) METHOD AND APPARATUS FOR IMAGE COMPRESSION

(75) Inventors: Chin-Yi Chiang, Taipei (TW); Wallace Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 686 days.

(21) Appl. No.: 11/297,739

(22) Filed: Dec. 8, 2005

(65) Prior Publication Data

US 2006/0165297 A1    Jul. 27, 2006

(30) Foreign Application Priority Data

Jan. 21, 2005    (TW) ............... 94101924 A

(51) Int. Cl.
G06K 9/36    (2006.01)
H04N 7/12    (2006.01)

(52) U.S. Cl. .................. 382/232; 375/240.24

(58) Field of Classification Search ........ 382/232, 382/239, 250, 251, 305, 312, 235, 244; 375/240.2, 375/240.21, 240.24

See application file for complete search history.

(56) References Cited

U.S. PATENT DOCUMENTS 5,875,298 A * 2/1999 Harigaya et al. ....... 348/416.1
6,404,917 B1 6/2002 Kondo et al.
7,003,174 B2 * 2/2006 Kryukov et al. ............ 382/266

FOREIGN PATENT DOCUMENTS

| CN | 1209894 | 3/1999 |
|----|---------|--------|
| CN | 1212806 | 3/1999 |
| CN | 1314659 | 9/2001 |
| CN | 1480901 | 3/2004 |
| CN | 1543223 | 11/2004 |
| JP | 07050832 | 2/1995 |
| JP | 08098208 | 4/1996 |
| JP | 2000069501 | 3/2000 |
| JP | 2004048727 | 2/2004 |

* cited by examiner

Primary Examiner—Kanji Patel
(74) Attorney, Agent, or Firm—Thomas, Kayden, Horstemeyer & Risley

(57) ABSTRACT

A method and an apparatus for image compression. First, an image is partitioned into a plurality of image blocks, the image having A×B pixels, each of the image blocks having N×M pixels, wherein N is less than A and M is less than B. Next, a selected image block is outputted by selecting one of the image blocks as the selected image block. After that, a compressed image block is produced by storing the selected image block and compressing the selected image block. The step of outputting the selected image block and the step of producing the compressed image block are repeated until the image blocks are compressed into a plurality of compressed image blocks. Finally, a compressed image file is produced according to the compressed image blocks.

14 Claims, 4 Drawing Sheets

METHOD AND APPARATUS FOR IMAGE COMPRESSION

This application claims the benefit of Taiwan application Ser. No. 94101924,, filed Jan. 21, 2005,, the subject matter of which is incorporated herein by reference.

BACKGROUND OF THE INVENTION

1. Field of the Invention

The invention relates to image compression, and more particularly to an apparatus and a method for image compression.

2. Description of the Related Art

After an image is sampled and quantized by an image acquiring device, such as a charge coupled device (CCD) or a complementary metal-oxide semiconductor (CMOS), a large-sized raw image data file is produced. Such large-sized image data file would result in a slow rate of processing and transmission of the image data file. Data compression technique is thus employed in data processing to save the memory space for storing image data and time for transmission of the image data.

During image compression, a two-dimensional pixel array is taken from raw image data as a data unit for compression, for example, an 8×8, or 16×16, pixel array, instead of a one-dimensional pixel array. However, the image data are transferred to a buffer memory row by row because the data unit for transmission is a row of the image data. In this way, image compression does not begin until eight rows of image data have been transferred to the buffer memory if the data unit for compression is an 8×8, pixel array of the image. In the case of the data unit for compression being a 16×16, pixel array, image compression cannot start until 16, rows of image data have been transferred to the buffer memory. Besides, the buffer memory has to be large enough for temporarily storing eight or 16 rows of image data in view of the above examples. The cost for processing data is then increased due to the requirement for a large-sized buffer memory. Further, it is inefficient to wait for a specific amount of image data before data compression starts. Therefore, a more efficient approach is desirable.

SUMMARY OF THE INVENTION

It is therefore an object of the invention to provide an apparatus and a method for image compression wherein the data unit for transmission corresponds to the data unit for compression, for example being the same as that for transmission, so that the memory capacity of a buffer memory for use in image compression can be reduced and image compression can be performed immediately.

In accordance with an embodiment of the invention, a method for image compression is provided. First, an image is partitioned into a plurality of image blocks, the image having A×B pixels, each of the image blocks having N×M pixels, wherein N is less than A and M is less than B. Next, a selected image block is outputted by selecting one of the image blocks as the selected image block. After that, a compressed image block is produced by storing the selected image block and compressing the selected image block. The step of outputting the selected image block and the step of producing the compressed image block are repeated until the image blocks are compressed into a plurality of compressed image blocks. Finally, a compressed image file is produced according to the compressed image blocks.

In accordance with another embodiment of the invention, an apparatus for image compression is provided, including an image acquisition device, a buffer, and an encoder. The image acquisition device is used for partitioning an image into a plurality of image blocks, selecting one of the image blocks as a selected image block, and outputting the selected image block, wherein the image has A×B pixels, each of the image blocks has N×M pixels, where N is less than A and M is less than B. The buffer is employed for storing the selected image block. The encoder is used for compressing the selected image block and producing a compressed image block based on the selected image block until the image blocks are compressed into a plurality of compressed image blocks. A compressed image file is then produced according to the compressed image blocks.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
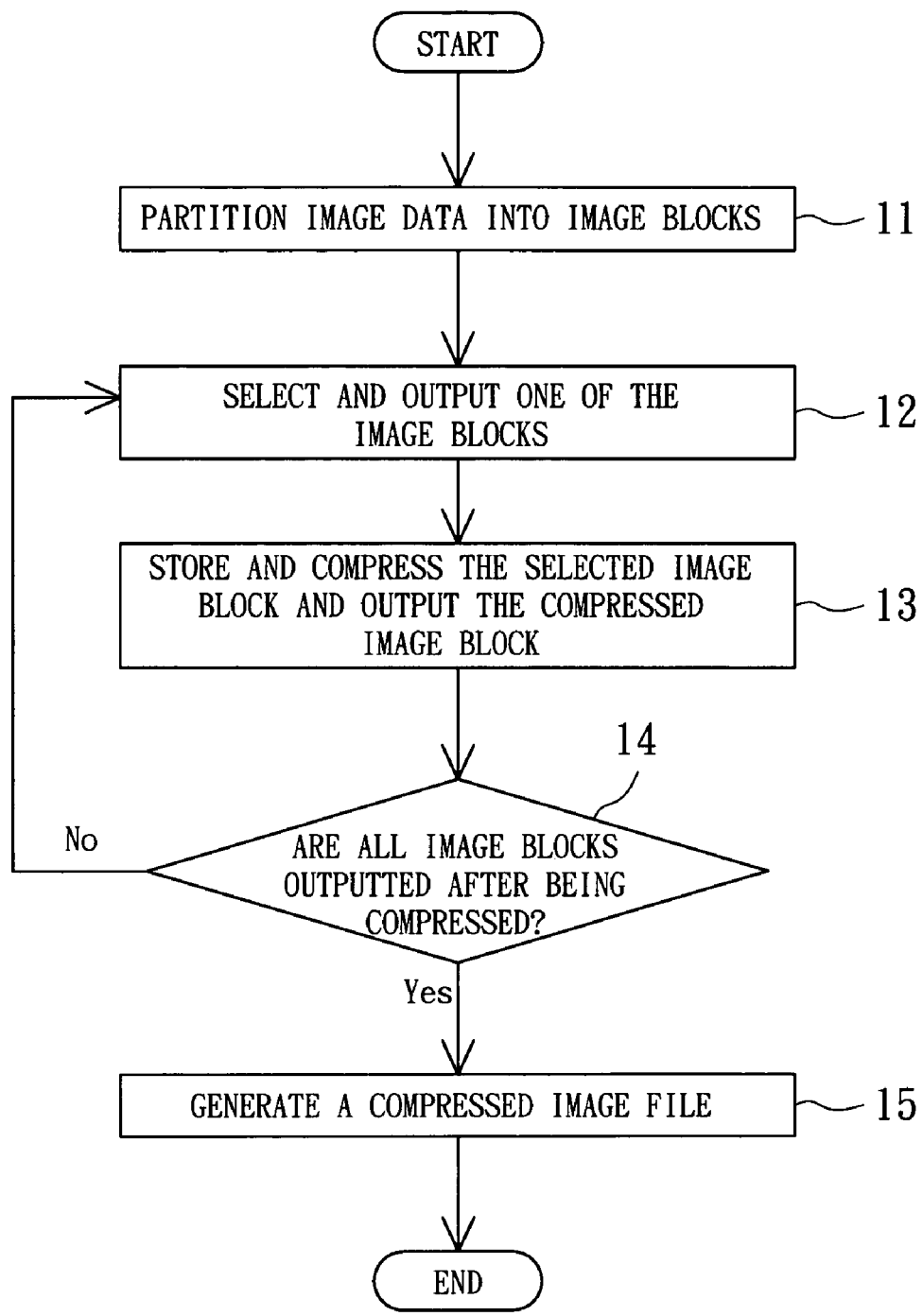
FIG. 1 shows a method for image compression according to an embodiment of the invention.

Referring to FIG. 1, a method for image compression is shown according to an embodiment of the invention. First, in step 11, an image is partitioned into a number of image blocks. The image has A×B pixels and each of the image blocks is a two-dimensional image block having N×M pixels, where N is less than A and M is less than B. Next, in step 12, one of the image blocks is selected and outputted, or transmitted, as a data unit in a form corresponding to a data unit for image compression of a specific image file format, such as JPEG or TIFF. For example, the image blocks are sequentially outputted or transmitted to an encoder for image compression, and the image blocks can be outputted in an order corresponding to the processing of image compression of the image file format. The selected image block is, then, stored temporarily, for example in a buffer, and the image compression of the image file format is performed on the image block stored in the buffer to produce a compressed image block, as shown in step 13. After that, step 14 is performed to determine whether all image blocks are compressed and corresponding compressed image blocks are produced. If not, the method proceeds to step 12. Finally, a compressed image file is generated according to the compressed image blocks, as indicated in step 15. For example, after one compressed image block is produced, it is stored in a memory, for example, the buffer mentioned above, in the way corresponding to the image file format. After all of the image blocks are compressed, data blocks of the memory storing the compressed image blocks can form a desired image file of the image in the specific image file format, such as JPEG or TIFF.

Figure 2:
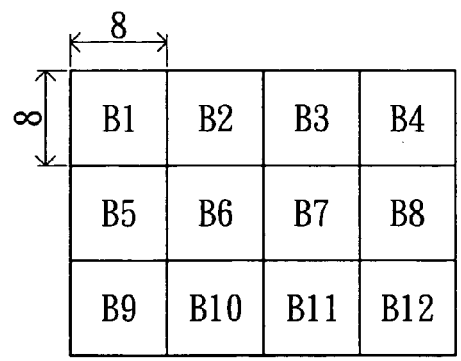
FIG. 2 illustrates the partition of image data into a number of image blocks.

In step 11, the partition of an image into image blocks is illustrated in FIG. 2. In FIG. 2, an image 200 is partitioned into image blocks B1 to B12, each of which is an array of pixels of a specific number depending upon the data unit for compression, for example, an 8×8, or 16×16, pixel array. For this example in FIG. 2, the image block is an 8×8, pixel array.

Figure 3:
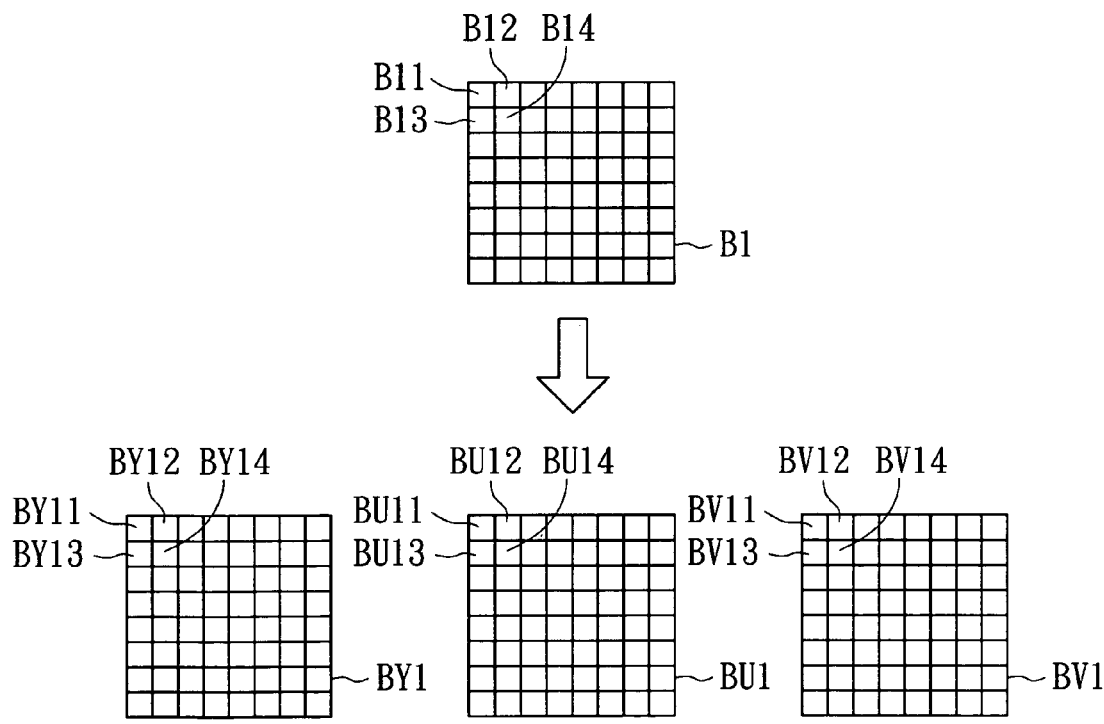
FIG. 3 illustrates an image block represented by three component image blocks in terms of luminance signal Y, color difference signal U, and color difference signal V respectively.

FIG. 3 illustrates an image blocks represented by three component image blocks in terms of a luminance signal and two color difference signals, Y, U, and V, respectively. In the embodiment, each pixel of the image 200 is in the form of a luminance signal and two color difference signals, Y, U, and V, of the pixel. For example, a pixel B11 is represented by pixels BY11, BU11, and BV11 in terms of a luminance signal and two color difference signals, Y, U, and V, respectively. Similarly, an image block B1 is represented by component image blocks BY1, BU1, and BV1 respectively, that is, the component image blocks in terms of a luminance signal and two color difference signals, Y, U, and V, respectively.

Figure 4:
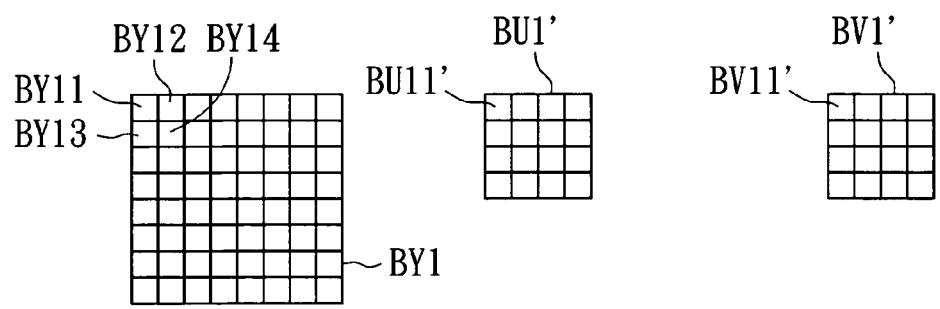
FIG. 4 illustrates the component image blocks of an image block represented in 4:2:0, format for transmission.

In step 12, during transmission of image blocks, each of the image blocks, such as image block B1, can be represented in a format, for example 4:2:2, 4:2:0, or 4:4:4, format, for transmission. FIG. 4 illustrates the component image blocks of an image block represented in 4:2:0, format for transmission. When the image block B1 is represented in 4:2:0, format for transmission, outputted are luminance data of the 8×8, pixel array of the component image block BY1 and color difference data of a quarter of the 8×8, pixel arrays of the component image blocks BU1 and BV1, respectively. In this case, the amount of color difference data outputted from the component image block BU1 are reduced from color difference data of the 8×8, pixel array of the component image block BU1 to those of a quarter of the 8×8, pixel array of the component image block BU1, that is, component image block BU1'. Similarly, the amount of color difference data outputted from the component image block BV1 are reduced from color difference data of the 8×8, pixel array of the component image block BV1 to those of a quarter of the 8×8, pixel array of the component image block BV1, that is, component image block BV1'.

Figure 5:
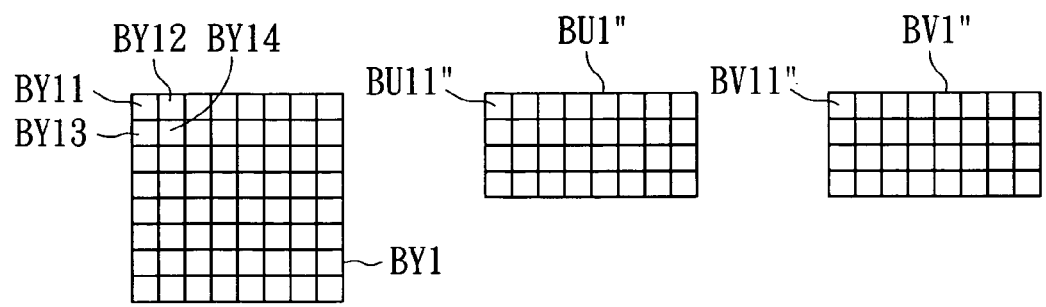
FIG. 5 illustrates the component image blocks of an image block represented in 4:2:2, format for transmission.

Referring to FIG. 5, the component image blocks of an image block are represented in 4:2:2 format for transmission. When the image block B1 is represented in 4:2:2, format for transmission, outputted are luminance data of the 8×8, pixel array of the component image block BY1 and color difference data of a half of the 8×8, pixel arrays of the component image blocks BU1 and BV1, respectively. In this case, the outputted amount of color difference data are reduced from color difference data of the 8×8, pixel array of the component image block BU1 to color difference data of a half of the 8×8, pixel array of the component image block BU1, that is, those of component image block BU1". Similarly, the outputted amount of V color difference data are reduced from color difference data of the 8×8, pixel array of the component image block BV1 to those of a half of the 8×8, pixel array of the component image block BV1, that is, those of component image block BV1".

In the case of the image block B1 represented in 4:4:4, format for transmission, all data of the 8×8, pixel arrays of the component image block BY1, BU1, and BV1, as shown in FIG. 3, are outputted.

A data amount reduction of a half or quarter in component image blocks BU1 and BV1 for transmission can be achieved by reduction schemes such as averaging adjacent pixels or subsampling. Referring to FIGS. 3 and 4, when 4:2:0, format is taken in transmission, adjacent pixels BU11, BU12, BU13, and BU14 of the component image block BU1 are averaged as a pixel BU11' in FIG. 4, and adjacent pixels BV11, BV12, BV13, and BV14 of the component image block BV1 are averaged as a pixel BV11' in FIG. 4. In another embodiment, the pixel BU1' is selected from the adjacent pixels BU11, BU12, BU13, and BU14, and the pixel BV11' is selected from the adjacent pixels BV11, BV12, BV13, and BV14.

Referring to FIGS. 3 and 5, when 4:2:2, format is taken for transmission, adjacent pixels BU11 and BU12 of the component image block BU1 are averaged as a pixel BU11" in FIG. 5, and adjacent pixels BV11 and BV12 of the component image block BV1 are averaged as a pixel BV11" in FIG. 5. In another embodiment, the pixel BU11" is selected from the adjacent pixels BU11 and BU12 and the pixel BV11" is selected from the adjacent pixels BV11 and BV12.

In addition to the image blocks represented in terms of YUV format, that is, component image block BY, BU, and BV, other representations of the image blocks can be applied in the implementation of the embodiments of the invention. For example, in another embodiment, the image blocks can be represented in terms of red (R), green (G), and blue (B) signals respectively. Each of the image blocks can be represented by three component image blocks in terms of R, G, and B signals respectively, that is, an image block BR for red color, image block BG for green color, and image block BB for blue color.

Figure 6:
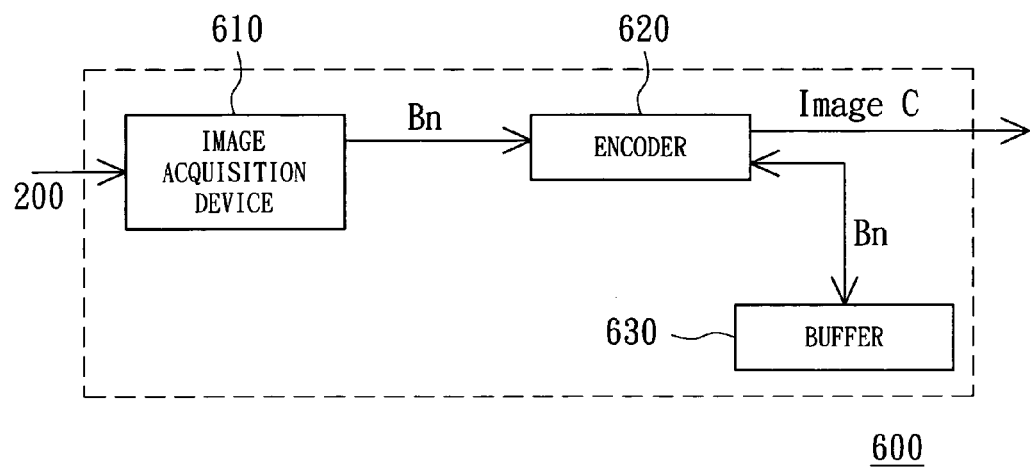
FIG. 6 shows an apparatus for image compression in accordance with an embodiment of the invention.

Referring to FIG. 6, an apparatus for image compression is shown in accordance with an embodiment of the invention. An image compression apparatus 600 includes an image acquisition device 610, an encoder 620, and a buffer 630. The image acquisition device 610 is used for acquiring an image 200, partitioning the image 200 into a number of image blocks, selecting one of the image blocks as a selected image block, outputting the selected one, that is, image block Bn. The selected image block can be outputted, for example, consecutively. The image 200 has A×B pixels and each of the image blocks has N×M pixels, where N is less than A and M is less than B. The buffer 630 is used for temporarily storing the selected image block Bn. The encoder 620 performs compression on the selected image block Bn so as to produce a compressed image block until all of the image blocks are compressed as a number of compressed image blocks. A compressed image file, denoted by Image C in FIG. 6, is finally outputted according to the compressed image blocks.

The image acquisition device 610 can provide a representation of the image block Bn in terms of luminance and color difference signals, Y, U, and V, respectively, as above disclosed, and send out the image block represented in 4:2:2, 4:2:0, or 4:4:4, format for transmission. In another embodiment, the selected image block Bn can be represented in terms of R, G, and B signals and outputted. The compressed image blocks, for example, can be stored in the buffer 630 for the production of the compressed image file, Image C, or outputted sequentially.

In the method and apparatus for image compression disclosed according to the embodiments of the invention, image blocks which composes an image are transmitted to the buffer and encoder block by block, instead of row by row of the image. According to the invention, the data unit for compression corresponds to the data unit for transmission so that the memory capacity of a buffer memory for use in image compression can be reduced and image compression can be performed immediately.

While the invention has been described by way of example and in terms of embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for image compression in which image blocks composes an image are transmitted to a buffer and an encoder block by block, instead of row by row of the image, comprising:

an image acquisition device for partitioning an image into a plurality of image blocks, selecting one of the image blocks as a selected image block, and outputting the selected image block, wherein the image has A×B pixels, each of the image blocks has N×M pixels, where N is less than A and M is less than B; and an encoder for compressing the selected image block and producing a compressed image block based on the selected image block until the image blocks are compressed into a plurality of compressed image blocks, wherein a compressed image file is produced according to the compressed image blocks.

2. The apparatus according to claim 1, further comprising a buffer for storing the selected image block.

3. The apparatus according to claim 1, wherein the selected image block has a luminance signal Y, a color difference signal U, and a color difference signal V.

4. The apparatus according to claim 3, wherein a luminance image block BY is consisted of the luminance signals Y, a color difference image block BU is consisted of the luminance signals U, and a color difference image block BV is consisted of the luminance signal V.

5. The apparatus according to claim 4, wherein each of the selected image block, the luminance image block BY, the color difference image block BU, and the color difference image block BV is N×M pixels.

6. The apparatus according to claim 5, wherein the image acquisition device outputs the selected image block in 4:2:2 format by outputting data of the N×M pixels in the luminance image block BY, data of a half of the N×M pixels in the color difference image block BU, and data of a half of the N×M pixels in the color difference image block BV.

7. The apparatus according to claim 5, wherein the image acquisition device outputs the selected image block in 4:2:0 format by outputting data of the N×M pixels in the luminance image block BY, data of a quarter of the N×M pixels in the color difference image block BU, and data of a quarter of the N×M pixels in the color difference image block BV.

8. The apparatus according to claim 5, wherein the image acquisition device outputs the selected image block in 4:4:4 format by outputting data of the N×M pixels in the luminance image block BY, data of the N×M pixels in the color difference image block BU, and data of the N×M pixels in the color difference image block BV.

9. The apparatus according to claim 1, wherein the selected image block has a red signal R, a green signal G, and a blue signal B.

10. The apparatus according to claim 9, wherein a red image block BR is consisted of the red signals R, a green image block BG is consisted of the red signals G, and a blue image block BB is consisted of the red signals B.

11. The apparatus according to claim 10, wherein each of the selected image block, the red image block BR, the green image block BG, and the blue image block BB is N×M pixels.

12. The apparatus according to claim 11, wherein the image acquisition device outputs the selected image block by outputting data of the N×M pixels in the red image block BR, data of a half of the N×M pixels in the green image block BG, and data of a half of the N×M pixels in the blue image block BB.

13. The apparatus according to claim 11, wherein the image acquisition device outputs the selected image block by outputting data of the N×M pixels in the red image block BR, data of a quarter of the N×M pixels in the green image block BG, and data of a quarter of the N×M pixels in the blue image block BB.

14. The apparatus according to claim 11, wherein the image acquisition device outputs the selected image block by outputting data of the N×M pixels in the red image block BR, data of the N×M pixels in the green image block BG, and data of the N×M pixels in the blue image block BB.

* * * * *

UNITED STATES PATENT AND TRADEMARK OFFICE
CERTIFICATE OF CORRECTION

PATENT NO. : 7,602,975 B2  Page 1 of 1
APPLICATION NO. : 11/297739
DATED : October 13, 2009
INVENTOR(S) : Chiang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Fifth Day of October, 2010

David J. Kappos
*Director of the United States Patent and Trademark Office*